(12) United States Patent
Fauteux et al.

(10) Patent No.: US 6,908,711 B2
(45) Date of Patent: Jun. 21, 2005

(54) RECHARGEABLE HIGH POWER ELECTROCHEMICAL DEVICE

(75) Inventors: Denis G. Fauteux, Acton, MA (US); Hans Desilvestro, Howick (NZ); Marty Van Buren, Chelmsford, MA (US); Sonya Michelsen, Pokeno (NZ)

(73) Assignee: Pacific Lithium New Zealand Limited (NZ)

( * ) Notice: Subject to any disclaimer, the term of this patent is extended or adjusted under 35 U.S.C. 154(b) by 338 days.

(21) Appl. No.: 10/120,768

(22) Filed: Apr. 10, 2002

(65) Prior Publication Data

US 2003/0194605 A1 Oct. 16, 2003

(51) Int. Cl.$^7$ .................................................. H01M 4/58
(52) U.S. Cl. ............................. 429/231.95; 429/231.9; 429/210; 429/211; 429/224; 429/231.5; 429/152; 429/153; 429/223
(58) Field of Search .......................... 429/231.9, 231.95, 429/210, 211, 152, 153, 223, 224, 231.5

(56) References Cited

U.S. PATENT DOCUMENTS

| | | | | |
|---|---|---|---|---|
| 5,545,468 A | * | 8/1996 | Koshiba et al. .......... 429/231.1 |
| 5,588,971 A | * | 12/1996 | Fauteux et al. ............ 29/623.5 |
| 5,591,544 A | * | 1/1997 | Fauteux et al. ............. 429/209 |
| 5,595,839 A | * | 1/1997 | Hossain ...................... 429/210 |
| 5,635,312 A | | 6/1997 | Yanagisawa et al. ......... 429/94 |
| 5,766,796 A | * | 6/1998 | Abraham et al. ........... 429/314 |
| 6,130,003 A | | 10/2000 | Etoh et al. .................... 429/99 |

* cited by examiner

Primary Examiner—Bruce F. Bell
(74) Attorney, Agent, or Firm—Factor & Lake

(57) ABSTRACT

The present invention is drawn to a high power electrochemical energy storage device, comprising at least one stackable, monolithic battery unit. The monolithic battery unit includes at least two electrochemical energy storage cells. The cells have a lithium ion insertion anode and a lithium ion insertion cathode, a bipolar current collector between cells and end plate current collectors at the opposing ends of each battery unit. A frame may be associated with the perimeter of the current collector. The current collector comprises a high-conductivity metal. The device also has the at least two storage cells substantially aligned adjacent one another, a separator material associated between the anode and the cathode within each cell; and an electrolyte within each cell.

Additionally, the present invention is drawn to a device combining two or more of the monolithic units, either in series or in parallel or any combination thereof, so as to create a high power, high voltage energy storage device.

80 Claims, 6 Drawing Sheets

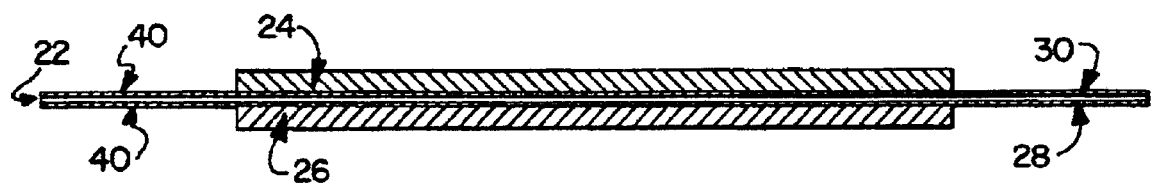
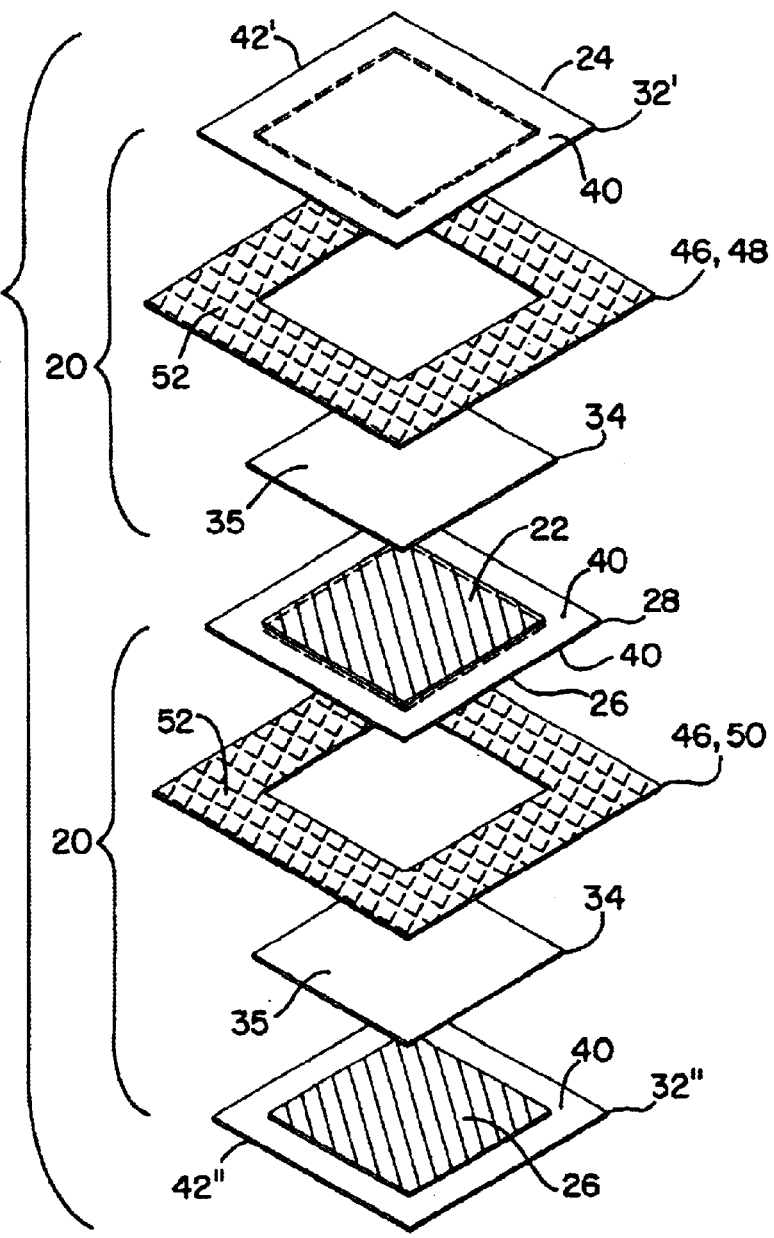

RECHARGEABLE HIGH POWER ELECTROCHEMICAL DEVICE

BACKGROUND

1. Field of the Invention

The present invention relates in general to electrochemical devices, and, more particularly, a high power electrochemical device capable of providing instantaneously available high power. For example, such high power devices are useful for providing instantaneous power in the event of transient power losses and poor power quality of supplied main power.

2. Prior Art

The need for quality power is ever increasing. Current and future sophisticated electric and electronic devices are particularly sensitive to power supply issues. For example, poor power supply and transient power losses in supplied main power which last only milliseconds can have an adverse impact on electronic equipment. Such power issues can result in the destruction of electronic equipment, the loss of generated data, the loss of communication with other equipment, and the loss of time required to reset and restart procedures that were interrupted by the loss in power.

Certain solutions have been developed to provide instantaneous power in response to transient power interruptions and other associated power problems, including, uninterruptible power systems (UPS systems). In such systems, lead-acid batteries are often used to provide temporary power when necessary. While such solutions have had some success, lead-acid batteries have certain problems, including, but not limited to, a limited cycle life, a high failure rate, high cost of maintenance, weight and size considerations, poor durability, self discharge issues, sensitivity to deep discharge and to temperature, as well as toxicity.

The present invention is directed to an electrochemical energy storage device, such as a rechargeable battery device, wherein both the cathode and anode are constructed from high rate materials, so as to result in high current density discharge capability of at least 0.05 A/cm². Such battery devices are of great interest for applications such as power quality, power backup or hybrid electric vehicles. While such devices exist in the older battery technologies of lead-acid, nickel-cadmium and nickel-metal hydride, large high power Li-ion batteries have not been introduced in large quantities to the market place yet, mainly due to safety considerations. Therefore, it is an object of this invention to disclose a Li-ion battery device with excellent safety and performance characteristics by choosing materials and design geometries to minimize resistive losses and to maximize safety performance under abuse conditions, e.g. under full short-circuit. This document will disclose that a battery according to the present invention is safe under short-circuit conditions even in the absence of any safety features such as fuses, current limiters or temperature-activated switching devices. The present document will further disclose how to maximize power densities to at least 1000 W/kg, despite the stringent safety requirements.

Other solutions are electro-mechanical energy storage devices, such as both low speed and high-speed flywheels. Such devices draw energy from a primary power source and store it as the kinetic energy of the flywheel. When the primary power source is interrupted, the energy stored in the kinetic energy of the flywheel is converted into electrical energy. While this solution has likewise provided some success, there have been problems. These problems include limited energy storage available in a flywheel, load management abilities, excessive energy losses, safety concerns, high material costs and limited life of parts such as bearings or vacuum pumps.

Of particular interest in the power-supply area are electrochemical devices for high-power applications. These devices are capable of storing large amounts of energy through chemical reactions, and then are able to release that energy when needed. A number of different device types have been explored in this area, including the above-mentioned lead-acid batteries or other electrochemical energy storage devices such as nickel-cadmium, nickel metal hydride, zinc bromine batteries or supercapacitors. None of these devices are satisfactory for certain applications in the power quality sector, either due to their limited power or energy content for a given foot print or volume, their limited product life at more elevated temperatures, their sloping discharge profile, their toxicity or a combination of these disadvantages.

Accordingly, it is an object of the present invention to provide instantaneous power in response to interruptions and other power problems without the above-identified drawbacks.

These and other objectives will become apparent in light of the specification and claims appended thereto.

SUMMARY OF THE INVENTION

The present invention is directed, generally, to a high power battery comprising at least one stackable, monolithic battery unit capable of producing high power upon demand. The battery unit includes at least two electrochemical energy storage cells, and preferably a frame associated with the current collector. The cells have a lithium ion insertion anode and a lithium ion insertion cathode and a bipolar current collector between cells, and the frame is preferably associated with the perimeter of the current collector. The device also has the at least two storage cells substantially aligned adjacent one another, a separator material associated between the anode and the cathode within each cell; and an electrolyte within each cell.

Preferably, the anode of the present invention comprises a lithium ion insertion material having a voltage of greater than 0.5 V vs. the Li/Li⁺ potential, and even more preferably a voltage of approximately 1.5 V vs. the Li/Li⁺ potential. For example, the anode could include a lithiated titanium oxide. Similarly, the cathode preferably includes a doped lithium manganese oxide. Once assembled, it is preferred that both the anode and the cathode have a porosity of approximately 30% to approximately 60%. It is also preferred that both the anode and the cathode substantially comprise particles of spherical or of prolate ellipsoidal shape.

Once assembled, it is preferred that the device has a charge and discharge capability of at least 0.05 A/cm² for more than 10 s. Additionally, it is preferred that the device have the ability to withstand short-circuit tests according to UL® standard 2054 at ambient temperature and 60° C., without any added safety device.

In one preferred embodiment of the present invention, the device additionally comprises two end plates at either end of the aligned at least two storage cells, the end plates comprising a surface area, and two terminal plates conductively associated with the end plates, wherein the terminal plates of the device are electrically contacted over at least 20% of the end plate surface area by a contacting means. It is also preferred that one ore more terminal cables are joined to each of the two terminal plates to provide an electrical connection to the entire battery device.

In the above embodiment, the contacting means may comprise either mechanical pressure or the electrical contact may be achieved through any welding or soldering process or through the use of electrically conductive adhesives.

In the case of mechanical pressure, it is preferred that the mechanical pressure be supplied by a mechanical compression device associated with the battery unit. Such a device could comprise any number of configurations, including a device that comprises two parallel compression plates associated with the end portions of the battery unit, and means for manipulating the compression plates together so as to place pressure upon the battery unit. Preferably, the manipulating means comprises one or more screws associated with the compression plates. Additionally, the compression plates may directly be used as the terminal plates. In such an embodiment, the two parallel compression plates may be electrically insulated from each other by, for example, having the manipulating means comprise an insulated material.

Alternative to the compression device described above, mechanical pressure may be supplied by a shrink tubing encompassing the battery unit, or by one or more bands surrounding the battery unit. It is preferred that two terminal plates are thicker than the current collectors in order to provide effective overall current collection from the entire battery device. Additionally, it is preferred that the two terminal plates have a thickness of between approximately 0.2 and approximately 10 mm. In this embodiment, it is preferred that the two terminal plates comprise at least one of aluminum and aluminum alloy. Additionally, it is possible that the two terminal plates comprise a means for cooling, such as cooling fins associated with the two terminal plates, or at least one channel through at least one of the two terminal plates, wherein the at least one channel allows the passage of fluid over and through the terminal plates.

In still another embodiment, the contacting means preferably comprises two contact elements, wherein the two contact elements have a thickness of less than approximately 1 millimeter. Additionally, it is possible that the two contact elements each comprise an end surface, and at least one of the end surfaces provides a plurality of electrical contact points, and that the contact points are uniformly distributed across the end surfaces. The contact elements could comprise a conductive mat, such as a conductive foam or a conductive felt, or it could comprise a conductive mesh such as an expanded or a woven metal mesh. Preferably, the two contact elements comprise at least one of aluminum and nickel.

In the present invention, it is preferred that the bipolar and end plate current collectors comprise a material having a mass-normalized electronic sheet conductivity of greater than 70,000 S/g□, and a mass-normalized thermal sheet conductivity of greater than 0.5 W/g/K/□. One such collector could be an aluminum current collector. If such a collector type is selected, it is preferred that the current collector have a thickness of between approximately 20 micrometers and 80 micrometers, and a purity of greater than approximately 95% aluminum. Preferably, the collector has a purity of approximately 99% aluminum. In a preferred embodiment, all of the collectors have the same thickness. However, it is possible that said current collectors differ in thickness. In particular, the at least two end plate current collectors may be thicker than the at least one bipolar current collectors.

In another preferred embodiment of the present invention, the device additionally comprises at least one conductive primer layer, wherein the conductive primer layer is positioned between at least one of the anode and the current collector and the cathode and the current collector. The primer may be positioned between both the anode material and the current collector and between the cathode material and the current collector. Additionally, it may comprise a water-based ink, where the water is evaporated in a drying step. In any case, the primer layer preferably has a thickness of between approximately 1 micrometer and approximately 10 micrometers.

Additionally, the device may include a frame, wherein the current collector comprises a perimeter, and the frame is associated with the perimeter of the current collector. The frame may comprise at least one polymer layers such as at least one of a thermoplastic polymer and a thermoplastic ionomer. Alternatively, the polymer layer could be selected from one of the group consisting of polypropylenes, polyolefins, chlorinated or fluorinated polyolefins, acid-modified polypropylenes, acid-modified polyolefins, and polyesters.

In the above embodiment, it is preferred that the associated frame comprises a top and a bottom, wherein the top and the bottom are associated with each other so as to encompass the perimeter of the current collector, acting as the electrode substrate, therebetween. The frame may be secured to the current collector by a heat weld.

In an alternative embodiment, the frames of the at least two electrochemical energy storage cells are substantially aligned, and wherein the frames of the at least two electrochemical energy storage cells comprise a thickness so as to create adequate space to accommodate the anode and cathode layers, the separator and the electrolyte. In such an embodiment, the frames of the at least two electrochemical storage cells comprise a perimeter, and the associated frames are welded along the perimeter of the frames to create a fluid-tight seal. In a preferred embodiment, the fluid-tight seal is accomplished by a sealing process under partial vacuum. Preferably, the sealing process is accomplished under a pressure of at least 0.8 bar below atmospheric pressure.

In the invention, it is preferred that the electrolyte comprises a non-aqueous electrolyte. A number of electrolyte types can be effective in this environment, including a lithium-based salt selected from the group consisting of $LiPF_6$, $LiBF_4$, $LiN(SO_2CF_3)_2$, $LiN(SO_2C_2F_5)_2$, $LiC(SO_2CF_3)_3$, $LiClO_4$, $LiAsF_6$, lithium oxalato and other lithium borates. Preferably, the present embodiment also includes at least one electrolyte solvent, wherein the at least one solvent is associated with the electrolyte. Preferably, the at least one electrolyte solvent has a boiling point of 90° C. or greater, in order to allow for safe device operation up to at least 60° C., even under severe abuse conditions. It is also preferred that the solvent is selected from the group consisting of propylenecarbonate, diethylcarbonate, ethylenecarbonate, dimethylcarbonate, ethylmethylcarbonate, dimethylacetamide, diethylacetamide, gamma-butyrolactone, sulfolane, dimethylsulfite, diethylsulfite, trimethylphosphate, and valeronitrile.

In still another preferred embodiment of the present invention, the at least one battery unit comprises at least two monolithic battery units, and the at least two monolithic battery units are placed in electrical contact by at least one of a contacting means and a terminal current collector. In such an embodiment, the device has two end plate current collectors at either end of the aligned at least two storage cells, wherein said current collectors of the device are electrically contacted over at least 20% of the end plate surface area by a contacting means which may comprise a contact element. Such an embodiment may further comprise at least two terminal plates and optionally at least one contact element. In a preferred embodiment, contact elements between two end plate current collectors of the at least two battery units are identical to the contact element between the end plate current collector and the terminal plate.

The at least two monolithic battery units may be electrically connected in series, in parallel, or in any combination of series and parallel connections. If the at least two monolithic battery units are connected in parallel the entire battery device may contain an even number of battery units and two terminal plates, electrically connected in a way that the top and the bottom terminal plates are at the same voltage of one polarity and that the point of the opposite polarity is in the center of the stack of the even number of battery units. In such a case, the manipulating means could comprise a conductive material.

BRIEF DESCRIPTION OF THE DRAWINGS

FIG. 1 is a cross-sectional schematic of a bipolar plate in accordance with principles of this invention;

FIG. 2 is an isometric view of a two-cell bipolar battery and its components in accordance with principles of this invention;

DETAILED DESCRIPTION OF THE INVENTION

Figure 3:
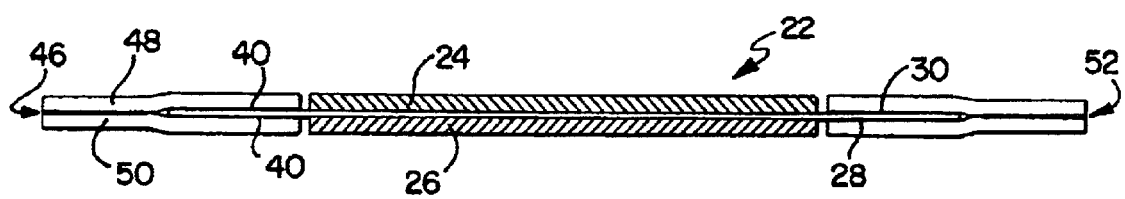
FIG. 3 is a cross-sectional schematic of a bipolar plate with its polymeric frames attached in accordance with principles of this invention.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

The present high power battery device is based on at least one bipolar plate 22, shown in FIG. 1 and on at least two endplates 32', 32" exemplified in FIG. 2, forming at least two electrochemical energy storage cells 20 therebetween. As can be seen in FIG. 1, bipolar plate 22 comprises anode 24, bipolar current collector 28, cathode 26, and primer layers 40. Anode 24 and cathode 26 comprise lithium ion insertion materials. In a preferred embodiment, these lithium ion insertion materials are combined with a binding agent to create a paste containing the active material of the cell and possibly a conductivity-enhancing agent such as particulate carbon or nickel. This paste is then applied to bipolar current collector 28, creating a film. It should be noted that both anode 24 and cathode 26 can be used in a variety of forms, but for the sake of simplicity will be referred to as films throughout the following discussion.

Preferably, lithium ion insertion materials comprise any of a number of materials capable of providing high-voltage capacity to the cell. For example, the cathode 26 of the present invention preferably comprises a doped lithium manganese oxide cathode, most preferably of the spinel type. Alternatively, the cathode could comprise $LiCoO_2$, $LiNiO_2$, or $LiMnO_2$ or variations of these compositions comprising other dopant elements such as B, Al, Mg, Ca, Zn, Fe, Mn, Ni, Co, Cr. Similarly, the anode 24 of the present invention preferably comprises a lithiated titanium oxide anode, such as $LiTi_2O_4$, $Li_{4+x}Ti_5O_{12}$, or $Li_xTiO_2$. In the most preferred embodiment, the anode material is of the spinel type.

The anode materials disclosed above provide an important characteristic to the present invention. The use of, for example, a lithiated titanium oxide anode ensures a high electrode potential of around 1.5 V vs. the $Li/Li^+$ potential. This high potential provides, in contrast to standard lithium-ion cells, a large safety margin to avoid plating of metallic lithium during fast recharge of the high power battery device. This safety margin is additionally of importance for high voltage batteries based on lithium ion insertion materials according to the present invention, since there is a higher probability that a cell in a battery device comprising a large number of individual cells becomes unbalanced in terms of its ratio of anode-to-cathode capacity. If a cell were to become unbalanced, the significantly increased voltage drop before metallic lithium plating occurs provides for easier detection of the potential change. Once detected, operation of the entire battery device or part of the device may be halted or altered to compensate for the change, increasing the overall safety of the device.

Further, in order to maximize high-rate performance, the present invention includes electrodes having active material particles of particular shapes. For example, active material particles are preferably of prolate ellipsoidal shape, and most preferably of spherical shape. Electrodes based on such particles offer higher electrolytic conductivity than electrodes based on particles with oblate ellipsoidal, disk-like, flaky, lamellar or irregular shape.

Of particular interest in this invention is the bipolar current collector 28, which is in part responsible for energy transference within and heat transference out of the battery. In standard bipolar batteries, such as zinc bromine batteries, the bipolar current collector is often based on current collectors comprising graphitic or carbonaceous materials. Such materials are not high conductivity materials such as the aluminum collector, preferred in the present invention. Aluminum is generally not selected as a potential current collecting material for the negative electrodes in standard lithium-ion batteries comprising carbonaceous anodes, as the aluminum would interfere with the desired electrode reaction. However, in the present invention, the use of an anode material having a higher electrode potential, such as lithium titanium oxide, precludes such negative interactions.

As a current collector, aluminum provides a number of advantages for high power batteries because of its high electronic and thermal conductivity. These characteristics allow the current collector to conduct large amounts of energy without significant heat accumulation. The electronic sheet conductivity for aluminum, normalized by the mass of any square sheet of material, is significantly higher (140,000 S/g/□) than for copper (66,000 S/g/□) or silver (60,000 S/g/□). Similarly, the thermal sheet conductivity of any square sheet of material is significantly higher for aluminum (0.88 W/g/K/□) than for copper (0.45 W/g/K/□) or silver (0.41 W/g/K/□). In addition aluminum is readily available and sufficiently low cost.

Due to the advantages discussed, aluminum is the preferred material for the current collectors of the present invention since it minimizes electronic resistance within the cell, which in turn minimizes the temperature increase of the battery during high power applications or in the case of severe abuse such as a short-circuit. Alternatively, nickel or copper-aluminum or copper-nickel bimetallic current collectors may be considered. FIG. 1 schematically shows a bipolar plate 22 according to this invention, having an anode film 24 and a cathode film 26 on either side of the bipolar current collector 28. Preferably, bipolar current collector 28 is relatively thin, between approximately 80 and 20 micrometers, so as to minimize weight and the distance necessary to conduct electricity there through. Additionally, operation of the cell may further be improved by using bipolar current collector 28 having higher than 95% purity, and preferably having a purity of 99% or higher.

In order to further minimize battery internal resistance, a primer layer 40 may be applied onto both sides of bipolar current collector 28. The primer 40 preferably consists of a water-based ink, such as is available commercially from ACHESON®, or as disclosed in U.S. Pat. No. 6,087,045. However, any other similar conductive material can be used, especially any materials that provide a secure, conductive surface onto which anode film 24 and cathode film 26 may be applied.

Once applied, primer layer 40 should comprise a uniform coat over at least a portion of current collector 28, preferably of 1 to 10 micrometers dried thickness. The primer 40 may be applied onto the substrate through a continuous coating process or as a patterned layer on current collector 28. Similarly, the primer layer 40 can be applied over the entire bipolar current collector 28 surface or only to the areas where the electroactive materials are to be coated. Additionally, and as will be discussed further below relative to the anode and cathode end plates 32', 32" shown in FIG. 2, primer layer 40 may additionally provide a conductive pathway to those structures.

Once primer layer 40 is applied, the electroactive cathode 26 and anode 24 films are coated onto two separate sides of the current collector 28, either simultaneously from both sides or subsequently, with one side after another. Preferably, cathode 26 and anode 24 are patch-coated in registration. Alternatively, cathode 26 and anode 24 materials may be continuously coated, additionally allowing electroactive material to be removed after the coating process so as to provide the required size for cathode 26 and anode 24 layers.

Once properly assembled, the bipolar plates 22 are dried and compacted in order to obtain the desired electrode porosity, preferably in the range of 30–60%. Electrode compaction can be achieved through a calendering process, through two or several rolls, or through any other process applying sufficient mechanical pressure or a combination of mechanical pressure and heat. Depending on the mechanical and Theological properties of cathode 26 and anode 24 films, electrode compaction can be done for cathode 26 and anode 24 either simultaneously or one after the other.

Another embodiment of the present invention is shown in FIG. 2, wherein a pair of stacked electrochemical storage cells 20 is displayed. Stacked storage battery cells 20 are shown as comprising first end plate 32' having anode film 24 and end plate current collector 42', bipolar plate 22 having cathode 26 and anode 24 film and bipolar current collector 28, and second end plate 32" having cathode film 26 and end plate current collector 42". Through this configuration, two distinct electrochemical cells 20 are formed, with each comprising a layering of anode 24, separator 34, and cathode 26 between current collectors 28, 42. This configuration provides an environment for electrochemical reactions to charge and discharge the anode 24 and cathode 26 species, to store or discharge energy.

In this structure, anode 24, end plate current collectors 42', 42", and cathode 26 of end plates 32', 32" can comprise any number of materials, but preferably comprise the same or similar materials as in the bipolar plate 22 discussed above. Preferably, end plate current collectors 42', 42" are of the same composition and thickness as the bipolar current collectors 28, although certain applications may make it more advantageous to use end plate current collectors 42', 42" being thicker than bipolar current collectors 28.

FIGS. 2–3 show the present invention in conjunction with frames 46, discussed further below. As will be discussed, frames 46 are used to seal and package the device. Preferably, frames 46 consist of a thermoplastic or of several thermoplastic layers laminated together. Frame 46 materials may consist of polymers such as polypropylene or any other polyolefin, acid-modified polypropylene or polyolefins, polyester, polyvinylidenechloride, SURLYN®, ACLAR® or any other material with appropriate barrier properties, heat-sealability and chemical and electrochemical compatibility with the battery components. One or several layers may include additives to improve barrier properties and/or to trap moisture. In a preferred embodiment, each frame 46 consists of a top 48 and a bottom 50. The two parts are attached to the bipolar 28 or to end plate current collectors 42', 42" along the whole perimeter 30, 43 of those structures by a welding process or any other method known to those skilled in the art. In addition, top 48 and bottom 50 may be welded together along their own outer perimeter 52. Many other processes can be designed to provide framed electrodes, which are in the spirit of this invention and provide an embodiment schematically shown in FIGS. 2–3.

As an example, a similar frame structure can be achieved by any moulding technique, involving mould injection of polymeric material with a suitable adhesion to the bare or primed or otherwise pre-treated substrate material, or involving a moulding process based on suitable adhesives. The polymeric material or adhesives can further contain additives for the purpose of improving barrier properties and said adhesives can be cured and hardened at ambient temperature or any other temperature, where the electrode components are thermally stable. Alternatively UV light or any other suitable source of radiation can harden the adhesives.

FIG. 2 shows such a framed structure in an exploded configuration. As can be seen, bipolar plate 22 detailed in FIG. 1 is surrounded by frames 46. Additionally the stackable battery components include separators 34 and end plates 32', 32". In order to facilitate the assembly process, the separator 34 may be mechanically attached to the polymeric frame 46, or to the current collectors 28, 42', 42" (see FIG. 4) by a heat-sealing process or through an adhesive or hot melt which is compatible with the electrolyte solution. Additionally, the separator can be attached around the whole perimeter 35 of the separator or, alternatively, at a few selected points only. Alternatively, the separator layer 34 can be laminated or bonded to one or both electrodes through at least one of heat and pressure or using adhesives that are compatible with the battery components.

Figure 4:
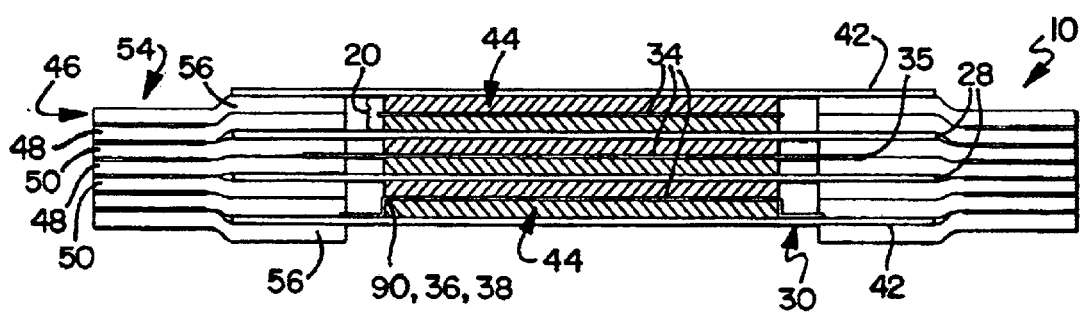
FIG. 4 is a cross-sectional schematic of a three-cell bipolar battery, further detailing the separator arrangement in accordance with principles of this invention.

The benefits of the addition of frames 46 can best be described by showing the present storage cells in stacked relation, as in FIG. 4, to create monolithic battery unit 10. Battery units 10 can yield higher overall voltages and thus higher power outputs for the device. In order to assemble such a unit, stackable battery components must be associated with one another as described below, and also should be encompassed at either end with endplates 32', 32".

Stackable battery components are assembled into monolithic battery units 10 by stacking at least one bipolar plate 22 between two end plates 32 to form at least two electrochemical cells 20 therebetween. Cells 20 are aligned with one another such that anode 24 of one cell faces cathode 26 of the same cell, with separator 34 therebetween. As the cells 20 are stacked, frames 46 should be aligned so that the entire structure may be manufactured into a single unit 10. The monolithic battery unit 10 may be capped on either end by, for example, an end plate of one polarity 32' on one end and an end plate of the other polarity 32" on the other end, as shown in FIGS. 2 and 4.

Once aligned, the edges of aforementioned polymeric frames 46 are then welded along the perimeter 52 in a way that will result in a prismatic monolithic unit 10, providing a hermetic, i.e. fluid-tight/air-tight, housing. Welding can be achieved from the side or the top and/or the bottom of the assembly through radiant or convective heat, with or without mechanical compression or through an ultrasonic or any other welding technique known to the specialist in the art. Unit 10 may also comprise additional end frame structures 56, covering part of the outer side of the end plates 32', 32" and being welded to the adjacent frame 46. In any case, frames 46 should have some thickness such that, once aligned, a space is created between the current collector of one cell and the current collector of the adjacent cell, called the cell pace 90. As will be described further below, the space 90 created by aligning frames 46 may be used to accommodate anode 24 and cathode 26 film, separator 34 and electrolyte 36 to promote operation of the battery.

As stated above, monolithic battery unit 10 has a non-aqueous electrolyte 36 inserted into each cell. The non-aqueous electrolyte 36 is applied before sealing all four sides of the monolithic unit 10. The electrolyte 36 may consist of a lithium-based salt such as $LiPF_6$, $LiBF_4$, $LiN(SO_2CF_3)_2$, $LiN(SO_2C_2F_5)_2$, $LiC(SO_2CF_3)_3$, $LiClO_4$, $LiAsF_6$, lithium oxalato and other lithium borates or any other salt providing a sufficiently large electrochemical window and sufficient electrolytic conductivity in combination with a suitable organic solvent or a mixture of solvents. Preferred solvents 38 have a boiling point of 90° C. or higher. Preferred solvents and solvent mixtures comprise propylene carbonate, diethylcarbonate, ethylene carbonate, dimethylcarbonate, ethyl-methylcarbonate, dimethylacetamide, diethylacetamide, gamma-butyrolactone, sulfolane, dimethylsulfite, diethylsulfite, trimethylphosphate, valeronitrile or any other solvent offering a high dielectric constant and/or a low viscosity. Preferably, the electrolyte 36 is inserted into unit 10 under partial vacuum conditions, preferably of −0.2 bar or lower, most preferably of −0.8 bar or better. By inserting the electrolyte 36 in this manner, and then sealing frames 46, the interior of monolithic battery unit 10 then has a pressure largely equivalent to the vacuum conditions at the time of sealing the frames 46.

The above discussion and FIG. 2 contemplates the insertion of two cells 20 into a monolithic battery unit 10, while FIG. 4 shows an example or a three-cell monolithic unit 10. However, it is possible to stack any number of cells 20 together, to accommodate a wide variety of power and voltage needs. Preferably, however, unit 10 includes between two and fifty cells 20.

Additional power needs may be met by combining monolithic units 10 in either series or parallel relation. The combination of units 10 is done to improve power output and consistency, as shown, for example, in FIG. 5. Monolithic units 10 may be combined in a variety of ways to complete a high voltage/high power device in a highly effective and flexible way. As will be described below, one preferred method of combining units 10 is to contact the end plates 32', 32" of monolithic units 10 externally in a way that relies on mechanical compression.

Figure 5:
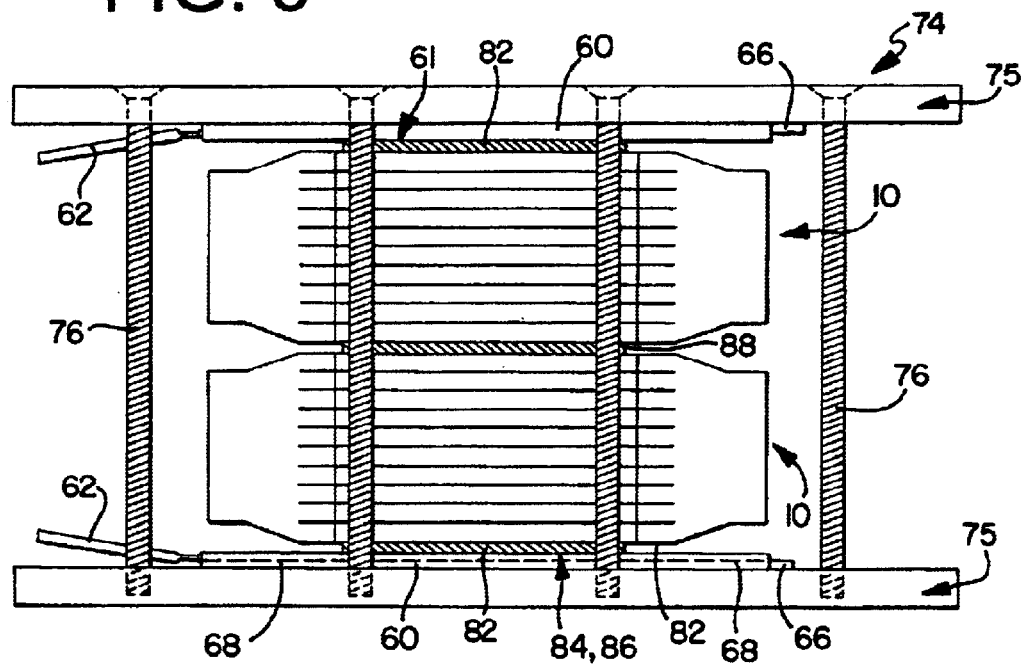
FIG. 5 is a cross-sectional schematic of a series connection of two 10-cell bipolar monolithic units in accordance with principles of this invention.

Monolithic units 10 may be combined in series according to FIG. 5 and/or parallel (not shown) by placing a terminal contact element 82 in between end plates 32', 32" of monolithic units 10 and a more massive terminal plate 60, or by placing a bridge contact element 88 in between the end plates 32', 32" of adjacent monolithic units 10. The connection between these elements is maintained, preferably, by external mechanical pressure. It is possible to contact end plates 32', 32" directly to terminal plates 60, or to directly contact end plates 32', 32" of adjacent monolithic units through conventional welding or bonding techniques. For example, and as would be known by one of ordinary skill in the art, terminal plates 60 could be soldered or welded to an end plate 32', 32" through ultrasonic, resistance, laser or any other welding or soldering technique in order to electrically and mechanically join the plates. However, such a procedure is time consuming, involves expensive equipment, and requires the application of high levels of thermal and/or vibrational stress onto the battery. Therefore, it is preferred that mechanical compression is used in the present device.

Generally, contact elements 82, 88 provide an electrical connection between the particular unit 10 to which they belong, to either the adjacent unit 10 or to an adjacent terminal plate 60. If the battery unit 10 comprises an external sealing frame 56 as described above, the thickness of the contact element 82, 88 is chosen so that it is slightly thicker than the thickness of the end frame 56, for the end plate 32', 32"-to-terminal plate 60 connection, or slightly thicker than two external frames 56 for the end plate 32', 32"-to-end plate 32', 32" connection. However, for the sake of minimizing resistance and volume, the thickness of the contact element 82, 88 should not be substantially larger than 1 mm. If there is no external frame structure 56, there are no other thickness restrictions than those imposed by the availability of suitable materials at reasonable cost. It is even possible to discard contact element 82, 88 all together, i.e. the terminal plate 60 could be directly pressed mechanically against the end plate 32', 32" and end plates 32', 32" of adjacent units 10 could be pressed directly against each other.

Despite the fact that an electrical connection can be established by purely contacting adjacent elements, it has been found that certain contact elements can substantially lower the contact resistance, and improve battery performance. For example, contact element 82, 88 may consists of a light-weight plate or mat with a surface 84 providing a large number of contact points 86 in a uniform way over the whole surface 84. The contact element 82, 88 may be metal foam or metal felt mat or a woven or expanded metal mesh. Materials for contact elements 82, 88 and terminal plates 60 are chosen mainly for their corrosion resistance, their electronic and thermal conductivity and their availability and cost. Copper, although suitable for reasons of electronic and thermal conductivity, and cost, is not the preferred material because of its long-term electrochemical incompatibility when contacted to aluminum, particularly in the presence of moisture or other corrosion-inducing agents. For the present invention, aluminum and nickel are the preferred materials. In comparison to the electrode substrate, a lower-grade aluminum can be used.

As an alternative to the disclosed contact element 82, 88, the surface 61 of the terminal plate 60 or the whole terminal plate 60 can be profiled or roughened, by a mechanical, a chemical or an electrochemical process, to provide suitable contact points to the end plates 32', 32". The terminal plate 60 can further comprise arrangements for cooling purposes such as cooling fins 66 for forced air-cooling or channels 68 or grooves 68 for cooling by water or any other suitable fluid. The contact element 82, 88 is connected to the terminal plate 60 or to two adjacent end plates 32', 32" by mechanical pressure as further detailed below. Alternatively, the terminal contact element 82 can be attached to the terminal plate 60 by any welding or bonding technique, through the use of conductive adhesives or by any mechanical fastening technique such as bolting, riveting, crimping or the like.

FIG. 5 shows, in a purely illustrative way, how two 10-cell bipolar monolithic units 10 can be connected in series. Any combination of the disclosed construction, in series and in parallel, can result in a high voltage/high power battery of any desired size, capacity and voltage. The two monolithic units 10 in FIG. 5 are connected in series through three contact elements (two terminal contact elements 82, and one bridge contact element 88) and two terminal plates 60. In a preferred embodiment, the contact elements 82, 88 are not welded or otherwise attached to the end plates 32', 32" and the electrical connection between contact element 82, 88 and end plates 32', 32" relies on mechanical pressure provided by gravity or additional mechanical compression further detailed below.

The combined battery structure may be connected to outside devices such as chargers, and voltage loads through terminal cables 62. The terminal cables 62 are attached to the terminal plates 60 by any suitable welding or soldering technique or by any mechanical fastening technique such as bolting, riveting, crimping or the like.

Once fully assembled, a mechanical compression can be applied to the resulting stack. Mechanical compression can be achieved through a mechanical compression device 74 consisting of two parallel plates 75 held together by screws 76 or by wrapping the battery with suitable shrink tubing 77 or by applying compression through any elastic or non-elastic fibrous or non-fibrous tapes, strings or ribbons 78. The screws 76 of compression device 74 may be conducting or non-conducting, as needed.

Depending on the size of the battery and the application, the battery device will in addition comprise fuses, circuit breakers or electronic relays, temperature sensing devices such as thermistors, optionally in conjunction with an appropriate electronic circuit in order to monitor the battery device and to assure that voltage, current and temperature limits remain within specified limits. In case of any abnormal behavior of the battery or parts of the battery, the whole battery or parts of the battery can be isolated electrically through the circuit breaker or electronic relay.

The principles of the invention described above, and specifically claimed herein, were used to assemble a battery device consistent with the above disclosure. The assembly of the device, as well as several alternative structures will be described below. However, the present disclosure is not intended to limit the invention to any of the particularly disclosed structures, except insofar as the appended claims are so limited.

In order to construct the present invention, it was preferred to first assemble an anode end plate, a cathode end plate, and an appropriate bipolar plate for the basic cell structure. In assembling the basic anode end plate, a small quantity of a slurry consisting of 9.0 wt % graphite, 0.9 wt % carbon black, 34:7 wt % aqueous lithium polysilicate solution (20% solution), 0.3 wt % Triton X-100, 1.2% fumed silica and 53.8 wt % de-ionized water, was applied to one side of a 75 $\mu$m thick sheet of aluminum foil of 1145 grade, using a drawdown rod, providing a carbon-primed substrate. After thorough drying, a 120×120 mm$^2$ sheet was cut. A. 100×100 mm$^2$ was then coated onto the carbon-primed side with a slurry of 89% $Li_4Ti_5O_{12}$, 5% carbon and 6% PVDF in N-methyl-2-pyrrolidinone, using a Doctor Blade technique and a 100×100 mm$^2$ mask. The device was then dried, and calendered, to produce an end plate structure with a porous anode film.

Similarly, steps were undertaken to construct a cathode end plate. In forming the cathode end plate, a small quantity of a slurry consisting of 9.0 wt % graphite, 0.9 wt % carbon black, 34.7 wt % aqueous lithium polysilicate solution (20% solution), 0.3 wt % Triton X-100, 1.2% fumed silica and 53.8 wt % de-ionized water, was applied to one side of a 75 $\mu$m thick sheet of aluminum foil of 1145 grade, using a drawdown rod, providing a carbon-primed substrate. After thorough drying, a 120×120 mm sheet was cut. A 100×100 mm$^2$ area was then coated onto the carbon-primed side with a slurry of 87% $Li_{1.05}Cr_{0.10}Mn_{1.90}O_4$, 5% carbon and 8% PVDF in N-methyl-2-pyrrolidinone, using a Doctor Blade technique and a 100×100 mm$^2$ mask. The cathode too, was dried and calendered to produce an end plate structure with a porous cathode film.

Finally, a bipolar plate structure was assembled. The structure was formed by taking a small quantity of a slurry consisting of 9.0 wt % graphite, 0.9 wt % carbon black, 34.7 wt % aqueous lithium polysilicate solution (20% solution), 0.3 wt % Triton X-100, 1.2% fumed silica and 53.8 wt % de-ionized water, and applying it to both sides of a 75 µm thick sheet of aluminum foil of 1145 grade, using a drawdown rod, providing a substrate which is carbon-primed on both sides. After thorough drying, a 120×120 mm² sheet was cut. A 100×100 mm² area was then coated onto one side with a slurry of 89% $Li_4Ti_5O_{12}$, 5% carbon and 6% PVDF in N-methyl-2-pyrrolidinone, using a Doctor Blade technique and a 100×100 mm² mask. After drying, a 100×100 mm² area was then coated onto the other side in registration with a slurry of 87% $Li_{1.05}Cr_{0.10}Mn_{1.90}O_4$, 5% carbon and 8% PVDF in N-methyl-2-pyrrolidinone, using a Doctor Blade technique and a 100×100 mm² mask. The cathode layer too, was dried and then the whole structure was calendered to produce a bipolar plate structure with porous electrode films.

The above structures were used in forming a variety of devices that fall within the scope of the disclosure of this application.

EXAMPLE 1

The above anode end plate, cathode end plate and bipolar plate were first combined into stackable electro chemical cells. First, 6 frames of SURLYN® 1652 film (DUPONT®) of 80 µm thickness were die-cut with 140×140 mm² outer dimension and 102×102 mm² inner dimension. To each side of the anode and cathode end plate and bipolar plate structures discussed above, a frame was attached by using a commercially available heated press. The cathode end plate and the bipolar plate, with their respective frames, were laid on a flat surface with the cathode facing upward. An 110×110 mm² piece of microporous polyolefinic separator was positioned on top of each of the two cathode layers and partially over the frames of the corresponding plate. For each of the two plates, the separator was then heat-welded to the frame on two opposite sides. The bipolar plate was then stacked on top of the cathode end plate, followed by the anode end plate, according to FIG. 2. Three sides of the 2-cell stack were then heat-sealed together by applying heat from the top and the bottom onto the frame edges. The appropriate amount of an electrolyte solution, containing 1M $LiPF_6$ in a 1:1 mixture of ethylene carbonate and diethyl carbonate, was then injected into each of the cells in order to thoroughly wet out the electrodes and the separator, without spilling onto the unsealed edge. In order to get rid of potential gas bubbles, the whole assembly was evacuated to −0.9 bar and allowed to equilibrate back to ambient pressure. The assembly was then evacuated another time to at least −0.95 bar and the open edge sealed under vacuum. This procedure resulted in a 2-cell bipolar monolithic unit of 5 V nominal voltage. Two pieces of 1 mm thick 97×97 mm² nickel foam mat with 60 ppi pore size was placed onto both end plates followed by 2 terminal plates of 1 mm aluminum sheet of grade 5005. The two aluminum sheets were of 100×100 mm² size, with a 10 mm wide tab being integral part of each sheet. This assembly was placed between two rigid FORMICA® plates of 160×160 mm² and tightened with 8 screws to a compression of about 1 kg/cm, as assessed by a PRESSUREX®-micro pressure sensitive mat purchased from Sensor Products Inc. This battery assembly was connected to a commercial battery-testing unit, using the aforementioned tabs of two terminal plates for electrical contacts.

Figure 6:
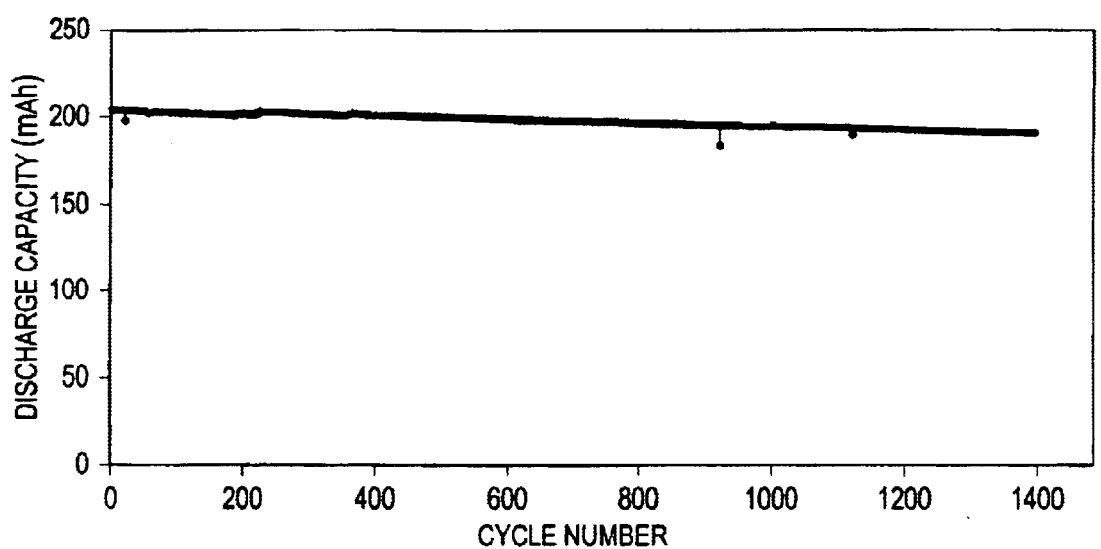
FIG. 6 is a graph displaying the capacity output as a function of cycle number for a 2-cell bipolar battery of the present invention.

FIG. 6 shows the capacity output of the above Example 1 over more than 1400 cycles when the battery device was charged and discharged at the 1C rate. After 1400 complete charge/discharge cycles the battery capacity was still at 94% of the initial one, showing the excellent cycle stability of a bipolar battery according to the present invention.

EXAMPLE 2

Another battery was assembled according to the above description, with slight alterations to create a higher-power device. Specifically, 9 bipolar plates were used instead of one only. This procedure resulted in a 10-cell bipolar monolithic unit of 25 V nominal voltage and 119 g weight, which was mounted in the same way in a compression device at about 1 kg/cm² compression.

Figure 7:
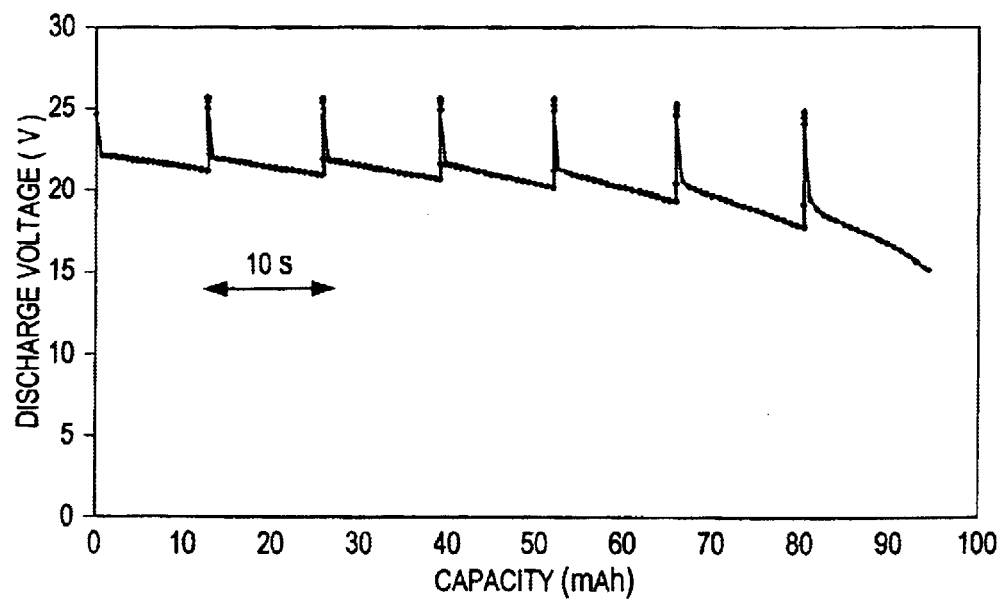
FIG. 7 is a graph displaying the high power discharge capability of a 10-cell bipolar battery of the present invention.

FIG. 7 shows the power performance of the 10-cell unit during 10 seconds discharge pulses of 0.1 W/cm², i.e. at a constant power rate of 100W, at an ambient temperature of 22° C. The battery was kept at open circuit for 5 minutes in between pulses. The performance of the battery during this test was excellent, considering that the discharge current density was as high as 0.07 A/cm². The power density of this non-optimized device approached 1000 W/kg.

EXAMPLE 3

After performing the high power discharge test as described above, the mechanical compression was briefly released in order to fit two Type K thermocouples in between the two end plates and the two nickel foam mats. The compression device was then tightened to about 0.3 kg/cm², as assessed by a PRESSUREX®-micro pressure sensitive mat purchased from Sensor Products Inc.

In order to assess safety performance of the battery device of the present invention, the new device with the thermocouples was tested during a full short circuit according to UL® battery safety standard 2054. Such an extreme abuse condition should not happen during any application since the battery device of the present invention is protected electrically and electronically. However, the abuse test evaluates the unlikely case that all electric and electronic safety features of the battery system fail or have been disconnected purposely.

Figure 8:
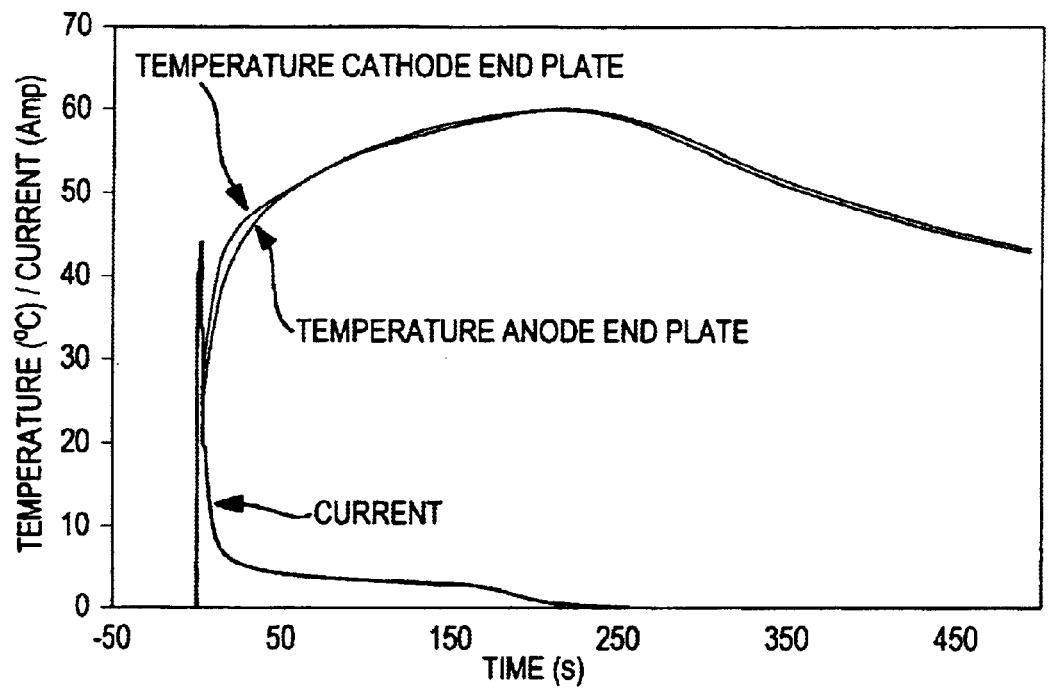
FIG. 8 is a graph displaying a short-circuit test at ambient temperature of the same 10-cell bipolar battery used for the test in FIG. 7.

The battery of the present example was initially at ambient temperature and was connected for the sake of this safety test to a 5 mOhm shunt in order to register the current. The overall resistance of the contacts, the connecting cable and the shunt were 20 mOhm, i.e. significantly lower than the maximum of 100 mOhm allowable by the UL® 2054 standard. FIG. 8 shows the short-circuit current and the temperatures at the two end plates. The current peaked at 44 A almost instantly, while the temperature at the end plates peaked at 60° C. after 210 seconds. The temperature then declined to below 25° C. over 2200 s.

The device of the present example was kept under short-circuit until the temperature had returned to below 25° C., i.e. for 2200 s. No fire or explosion occurred and the temperature of the battery device did not exceed 150° C. Thus the battery, as well as two additional samples according to the present example successfully passed the UL® 2054 short circuit test at ambient temperature.

Figure 9:
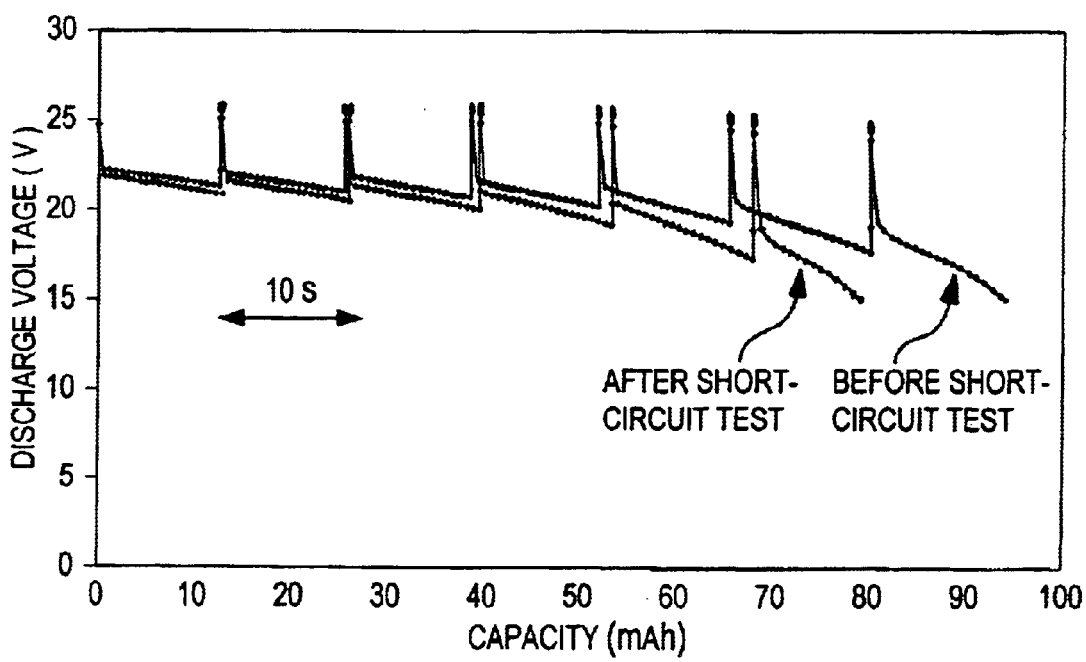
FIG. 9 is a graph displaying the high power discharge capability of the same 10-cell bipolar battery before and after the short-circuit test shown in FIG. 8.

The device was then retested for its high-rate performance after this severe abuse test. FIG. 9 shows the same pulse discharge test as shown in FIG. 7, before and after the short circuit test, revealing that no major loss in performance occurred, particularly over the first three pulses. Note that this outcome well surpasses requirements of the UL® 2054 standard that does not call for any remaining performance after such an abuse test.

EXAMPLE 4

Figure 10:
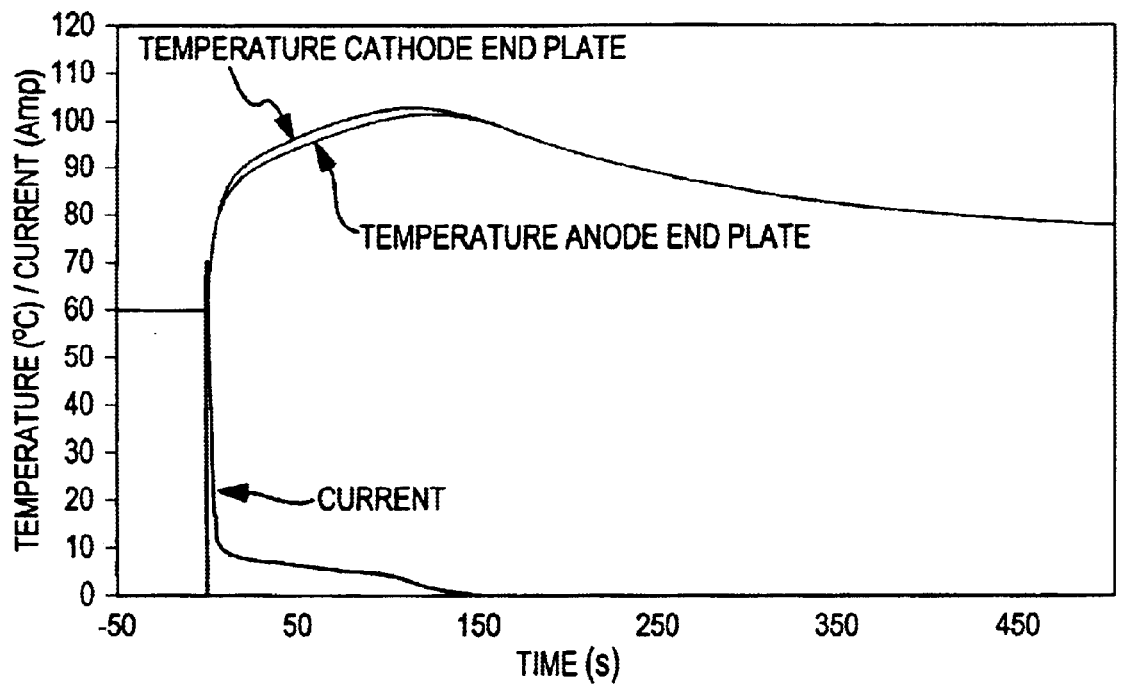
FIG. 10 is a graph displaying a short-circuit test at 60° C. of a 10-cell bipolar battery of the present invention.

Three more devices according to the previous example were assembled in order to be tested under short-circuit at 60° C. All three samples passed such a test without any fire, explosion or the battery temperature exceeding 150° C. FIG. 10 shows a representative result for one of the samples. The short-circuit current rose to 70 A almost instantly, corresponding to a current density of 0.7 A/cm$^2$ and then decayed to zero within 150 s. The temperature reached a maximum of 100° C. after about 2 minutes. The battery was kept under short-circuit until the temperature had returned to below 65° C., i.e. for about 1800 s. For all 3 samples tested at 60° C., no fire or explosion occurred and the temperature of the battery device did not exceed 150° C. Thus the batteries successfully passed the UL® 2054 short circuit test at 60° C.

EXAMPLES 5–7

In order to investigate the quality of the electrical contact between end plates of individual monolithic units and between said end plates and the two terminal plates, model configurations were designed to quantitatively determine the overall electrical contact for n monolithic units. Such information cannot be directly obtained from real batteries because of their own internal resistance. Each model configuration consisted of two 1 mm thick aluminum 5005 sheets of 100×100 mm$^2$ size with a 10 mm$^2$ wide tab being integral part of each sheet. Aluminum foils, grade 1145, of 75 μm thickness were chosen to simulate the electrical contact to the monolith end plates. TABLE 1, below, gives the test configurations to simulate the overall electrical contact resistance of 1–5 monolithic units with and without contact elements. For each configuration, the level of compression was adjusted mechanically and monitored with a compression load cell from OMEGADYNE®. Each configuration was characterized through AC impedance measurements, using a modulation amplitude 0.2 mV (rms) in order to determine the Ohmic resistance.

TABLE 1

| EXAMPLE | Contact element | Configuration, simulating n monolithic units | n |
|---|---|---|---|
| 5 | None | Al terminal/n(Al foil)/Al terminal | 1,2,4,5 |
| 6 | Nickel foam | Al terminal/Ni foam/ n(Al foil/Ni foam)/Al terminal | 0,1,2,4,5 |
| 7 | Al mesh | Al terminal/Al mesh/ n(Al foil/Al mesh)/Al terminal | 0,1,2,3,4,5 |

EXAMPLE 5

Figure 11:
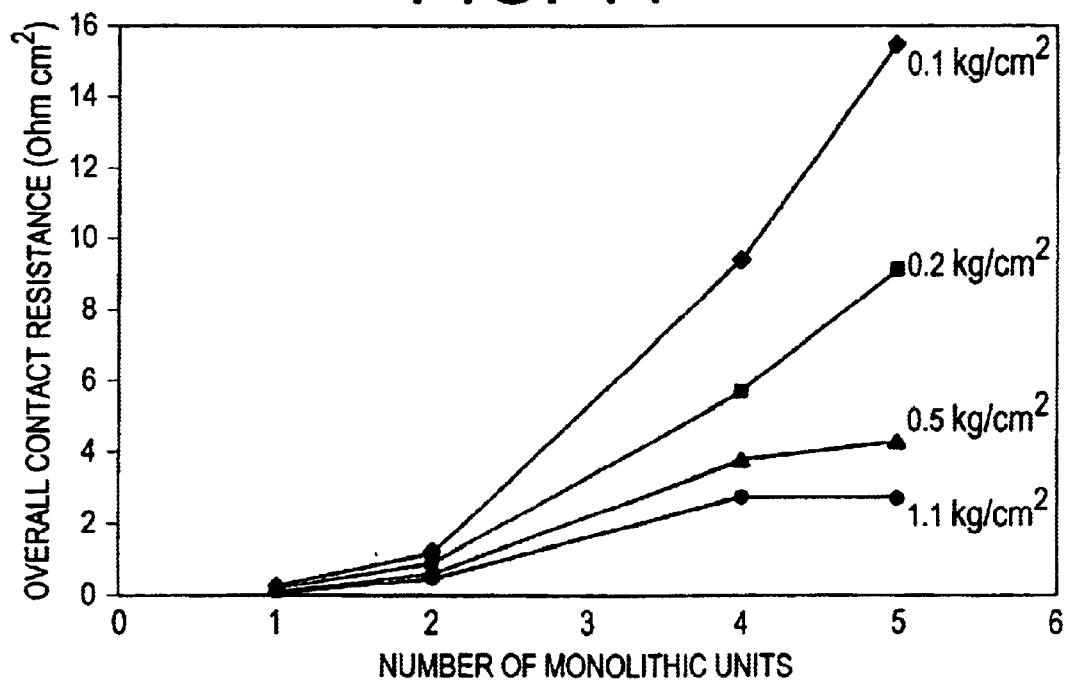
FIG. 11 is a graph displaying the area-normalized overall contact resistance of model configurations simulating n monolithic units according to the present invention, under compression ranging from 0.1 to 1.1 kg/cm² when no contact elements are used.

A number of resistance measurements were taken for a variety of contact areas, as will be explained herein in Example 5, and in the following examples 6 and 7. In this example, n (n=1,2,4,5) aluminum foils, grade 1145, of 95×95 mm$^2$ size and 75 μm thickness were cleaned with acetone and then placed between the two aforementioned aluminum 5005 terminal plates and compressed between 0.1 and 1.1 kg/cm$^2$. Note that n=1 simulates one monolithic unit, i.e. two aluminum foil-to-terminal plate interfaces. Similarly, n=2 simulates two monolithic units, i.e. two aluminum foil-to-terminal plate interfaces and one aluminum foil-to-aluminum foil interface, etc. FIG. 11 shows the overall resistance, normalized to the contact area of 95×95 mm$^2$ as a function of n and compression. The resistance does not increase linearly with the number of simulated monolithic units, especially at the lower compression levels of 0.1 and 0.2 kg/cm$^2$. These results indicate uneven contact interfaces, possibly due to slight irregularities in foil thickness or to slight buckling of the metal foils. With increasing compression, such contacting problems can be overcome partially. TABLE 2 gives the overall contact resistance for a simulated battery consisting of 5 monolithic units compressed at 0.1 and 1.1 kg/cm$^2$ without any contact element.

TABLE 2

| EXAMPLE | Contact resistance of 5 simulated monolithic units at 0.1 kg/cm$^2$ (Ohm cm$^2$) | Contact resistance of 5 simulated monolithic units at 1.1 kg/cm$^2$ (Ohm cm$^2$) |
|---|---|---|
| 6 | 15.5 | 2.8 |
| 7 | 0.43 | 0.07 |
| 8 | 19.3 | 5.7 |

EXAMPLE 6

Figure 12:
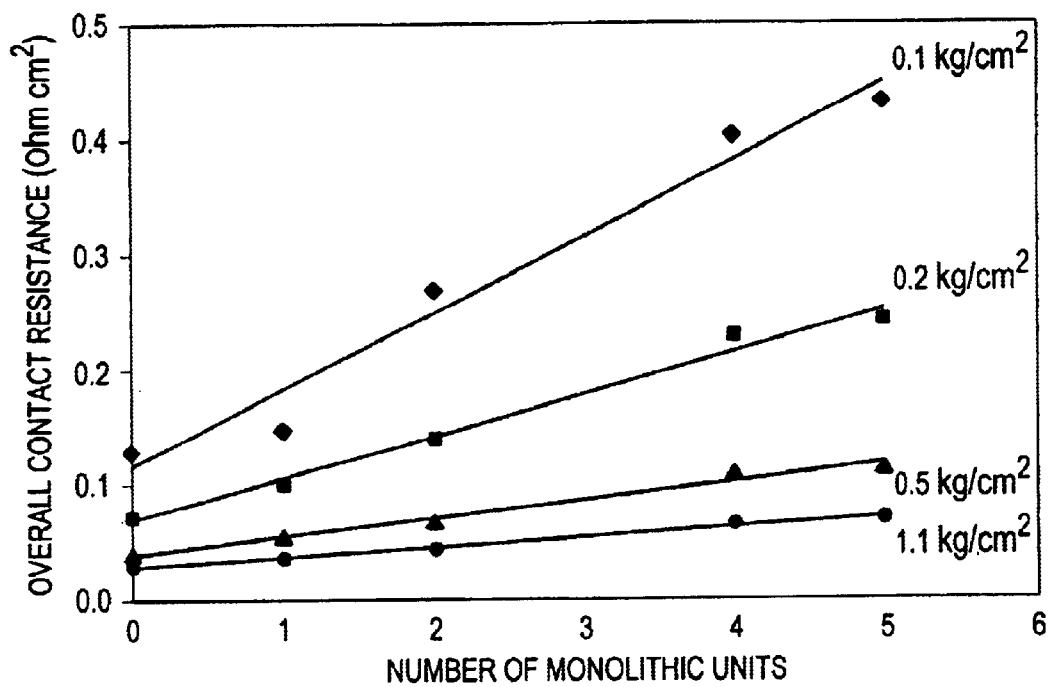
FIG. 12 is a graph displaying the area-normalized overall contact resistance of model configurations simulating n monolithic units according to the present invention, under compression ranging from 0.1 to 1.1 kg/cm² when contact elements based on nickel foam are used.

Similarly to the above example, n (n=0,1,2,4,5) aluminum foils, grade 1145, of 100×100 mm$^2$ size and 75 μm thickness were cleaned with acetone. n+1 pieces of 1 mm thick nickel foam mat with 60 ppi pore size were used as obtained from the vendor and cut to 95×95 mm$^2$ size. Nickel foam mats and aluminum foils were placed between the two aforementioned aluminum 5005 terminal plates and compressed between 0.1 and 1.1 kg/cm$^2$. Note that n=0 gives the contact resistance of two nickel foam-to-terminal plate interfaces. n=1 simulates one monolithic unit, i.e. two nickel foam-to-terminal plate interfaces and two aluminum foil-to-nickel foam interfaces. Similarly, n=2 simulates two monolithic units, i.e. two nickel foam-to-terminal plate interfaces and four aluminum foil-to-nickel foam interfaces, etc. FIG. 12 shows the overall resistance, normalized to the contact area of 95×95 mm$^2$ as a function of n and compression. The resistance increases practically linearly with the number of simulated monolithic units, especially at compression levels 0.2 kg/cm$^2$ and above. The lines shown in FIG. 12 were determined from linear regression of the experimental data. The coefficient of determination, $R^2$, was 0.97 for 0.1 kg/cm$^2$ compression and 0.99 for 0.2 kg/cm$^2$ and above. These results indicate very even contact interfaces between nickel foam and terminal plates as well as between nickel foam and the aluminum foils used as the electrode substrate. TABLE 2 gives the overall contact resistance for a simulated battery consisting of 5 monolithic units compressed at 0.1 and 1.1 kg/cm$^2$, using nickel foam mats as contact elements. The results show that contact elements based on nickel foam mats reduce the overall contact resistance very significantly and that a moderate compression of 0.1 kg/cm$^2$ is sufficient to provide a reliable low resistance contact.

EXAMPLE 7

Figure 13:
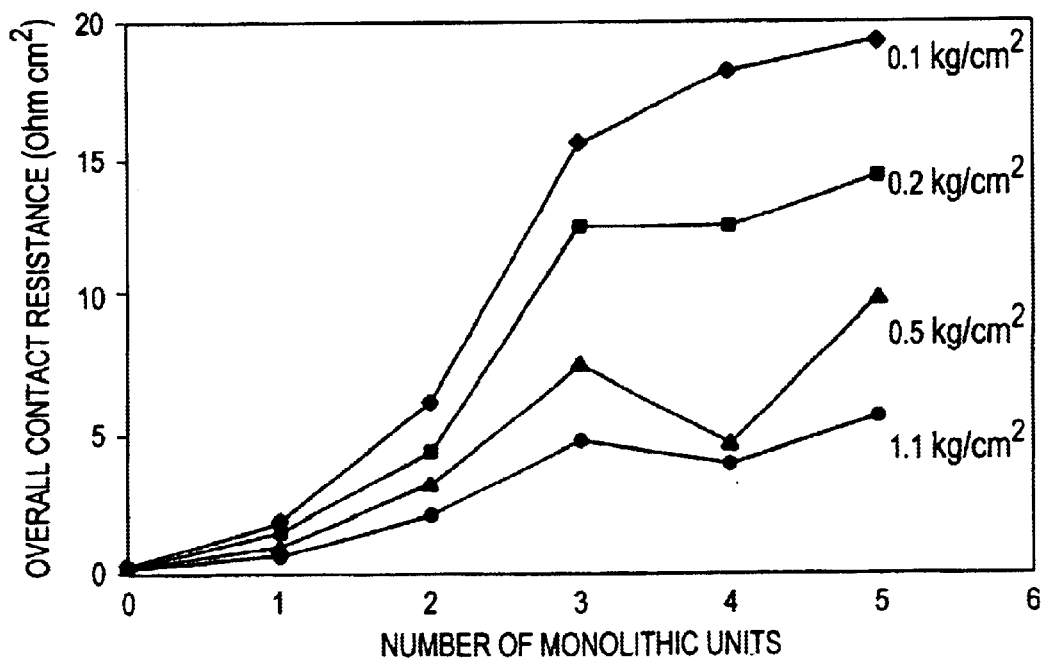
FIG. 13 is a graph displaying the area-normalized overall contact resistance of model configurations simulating n monolithic units according to the present invention, under compression ranging from 0.1 to 1.1 kg/cm² when contact elements based on aluminum mesh are used.

As with the above two examples, this example measured the resistance of a number of simulated monolithic units, based on a specific surface area contact. In this thickness were cleaned with acetone. n+1 95×95 mm$^2$ sized pieces of 0.5 mm thick woven aluminum mesh, mesh 0.28 mm, and from GKD were cleaned with acetone. Aluminum mesh pieces and aluminum foils were placed between the two aforementioned aluminum 5005 terminal plates and compressed between 0.1 and 1.1 kg/cm$^2$. Note that n=0 gives the contact resistance of two aluminum mesh-to-terminal plate interfaces. n=1 simulates one monolithic unit, i.e. two aluminum mesh-to-terminal plate interfaces and two aluminum foil-to-aluminum mesh interfaces. Similarly, n=2 simulates two monolithic units, i.e. two aluminum mesh-to-terminal plate interfaces and four aluminum foil-to-aluminum mesh interfaces, etc. FIG. 13 shows the overall resistance, normalized to the contact area of 95×95 mm$^2$ as a function of n and compression. The resistance does not increase linearly with the number of simulated monolithic units. These results indicate uneven contact interfaces. TABLE 2 gives the overall contact resistance for a simulated battery consisting of 5 monolithic units compressed at 0.1 and 1.1 kg/cm$^2$, using pieces of aluminum mesh as contact elements. The results show that the contact elements based on the investigated aluminum mesh does not reduce the overall contact resistance in comparison to example 5 with no contact elements at all.

The foregoing description, drawings and examples merely explain and illustrate the invention and the invention is not limited thereto except insofar as the appended claims are so limited, as those skilled in the art who have the present disclosure before them will be able to make modifications and variations therein without departing from the scope of the invention.

What we claim is:

1. A high power battery, comprising:
    a least one stackable, monolithic battery unit, the battery unit including:
        at least two electrochemical energy storage cells, the cells having:
            a lithium ion insertion anode and a lithium ion insertion cathode in facing relation to one another, wherein both the anode and the cathode comprise particles forming an electrode having a porosity of approximately 30% to approximately 60% each;
            a separator material associated between the anode and the cathode; and
            an electrolyte;
        wherein the at least two storage cells are substantially aligned adjacent one another in a bipolar configuration with a bipolar current collector therebetween, and end plate current collectors at the opposing ends of each battery unit.

2. The device according to claim 1, wherein the anode comprises a lithium ion insertion material having a voltage of greater than 0.5 V vs. the Li/Li$^+$ potential.

3. The device according to claim 1, wherein the anode comprises a lithium ion insertion material having a voltage of approximately 1.5 V vs. the Li/Li$^+$ potential.

4. The device according to claim 1, wherein the anode includes a lithiated titanium oxide.

5. The device according to claim 4, wherein the anode is selected from one of the group consisting of LiTi$_2$O$_4$, Li$_{(4+x)}$TiO$_2$ and Li$_x$TiO$_2$.

6. The device according to claim 4, wherein the lithiated titanium oxide is of the spinel type.

7. The device according to claim 1, wherein the cathode includes a lithium manganese oxide.

8. The device according to claim 7, wherein the lithium manganese oxide is of the spinel type.

9. The device according to claim 1, wherein the cathode comprises LiCoO$_2$.

10. The device according to claim 1, wherein the cathode comprises LiNiO$_2$.

11. The device according to claim 1, wherein the cathode comprises a lithium insertion material having a dopant selected from the group consisting of B, Al, Mg, Ca, Zn, Fe, Mn, Ni, Co and Cr.

12. The device according to claim 1, wherein both the anode and the cathode comprise particles having a substantially spherical shape.

13. The device according to claim 1, wherein both the anode and the cathode comprise particles having a substantially prolate ellipsoidal shape.

14. The device according to claim 1 having a charge and discharge capability of at least 0.05 A/cm$^2$ for more than 10 s.

15. The device according to claim 1 having the ability to withstand short-circuit tests according to UL® standard 2054 at ambient and 60° C., without any added safety device.

16. The device according to claim 1, wherein the end plates comprise a face area, the device additionally comprising two terminal plates conductively associated with the end plates, wherein the terminal plates of the device are electrically contacted over at least 20% of the end plate surface area by a contacting means.

17. The device according to claim 16, wherein one or more terminal cables are joined to the two terminal plates.

18. The device according to claim 16, wherein the contacting means comprises mechanical pressure.

19. The device according to claim 18, wherein the mechanical pressure is supplied by mechanical compression device associated with the battery unit.

20. The device according to claim 19, the mechanical compression device comprises:
    two parallel compression plates associated with the end portions of the battery unit; and
    means for manipulating the compression plates together so as to place pressure upon the battery unit.

21. The device according to claim 20, wherein the manipulating means comprises one or more screws associated with the compression plates.

22. The device according to claim 20, wherein the terminal plates and the compression plates comprise the same structure.

23. The device according to claim 20, wherein the two parallel compression plates are electrically insulated from each other.

24. The device according to claim 23, wherein the manipulating means comprises an insulated material.

25. The device according to claim 20, wherein the mechanical compression device is capable of providing a level of compression between 0.2 and 1 kg/cm$^2$.

26. The device according to claim 18, wherein mechanical pressure is supplied by a shrink tubing encompassing the battery unit.

27. The device according to claim 18, wherein mechanical pressure is supplied by one or more means for binding surrounding the battery unit, wherein the binding means is selected from one of the group consisting of fibrous tapes, non-fibrous tapes, strings, and ribbons.

28. The device according to claim 16, wherein the two terminal plates comprise at least one of aluminum and aluminum alloy.

29. The device according to claim 16, wherein the two terminal plates have a thickness of between approximately 0.2 and approximately 10 mm.

30. The device according to claim 16, wherein the two terminal plates comprise a means for cooling.

31. The device according to claim 30, wherein the cooling means comprises cooling fins associated with the two terminal plates.

32. The device according to claim 30 wherein the cooling means comprises at least one channel through at least one of the two terminal plates, wherein the at least one channel allows the passage of fluid over and through the terminal plates.

33. The device according to claim 16, wherein the contacting means comprises two terminal contact elements associated between the end plates and the terminal plates.

34. The device according to claim 33 wherein the two terminal contact elements are thicker than the individual bipolar current collector and end plate current collectors.

35. The device according to claim 34, wherein the two terminal contact elements have a thickness of less than approximately 1 millimeter.

36. The device according to claim 33, wherein the two contact elements each comprise an end surface, and at least one of the end surfaces provides a plurality of electrical contact points.

37. The device according to claim 36, wherein the plurality of electrical contact points are uniformly distributed across the end surfaces.

38. The device according to claim 33, wherein the two contact elements comprise a conductive mat.

39. The device according to claim 38, wherein the conductive mat comprises a conductive foam or a conductive felt.

40. The device according to claim 38, wherein the conductive mat comprises a conductive mesh.

41. The device according to claim 40, wherein the conductive mesh comprises an expanded or a woven metal mesh.

42. The device according to claim 33, wherein the two contact elements comprise at least one of aluminum and nickel.

43. The device according to claim 1, wherein at least one of the bipolar current collector and the end plate current collectors comprises a material having a mass-normalized electronic sheet conductivity of greater than 70,000 S/cm$^2$/g.

44. The device according to claim 1, wherein at least one of the bipolar current collector and the end plate current collectors comprises a material having a mass-normalized thermal sheet conductivity of greater than 0.5 W/cm$^2$/g/K.

45. The device according to claim 1, wherein at least one of the bipolar current collector and the end plate current collector comprises an aluminum current collector.

46. The device according to claim 45, wherein the aluminum current collector comprises a current collector having a thickness of between approximately 20 micrometers and 80 micrometers.

47. The device according to claim 45, wherein the aluminum current collector comprises a current collector having a purity of greater than approximately 95% aluminum.

48. The device according to claim 45, wherein the aluminum current collector comprises a current collector having a purity of approximately 99% aluminum.

49. The device according to claim 1, wherein bipolar current collector and the end plate current collectors comprise the same material and dimensions.

50. The device according to claim 1, wherein the device additionally comprises at least one conductive primer layer, wherein the conductive primer layer is positioned between at least one of the anode and the adjacent current collector and the cathode and the adjacent current collector.

51. The device according to claim 50, wherein the conductive primer layer is positioned between both the anode material and the adjacent current collector and between the cathode material and the adjacent current collector.

52. The device according to claim 50, wherein the conductive primer layer is positioned between both the anode material and the adjacent current collector and between the cathode material and the adjacent current collector and extends over the entire surface of the current collector facing the anode or the cathode.

53. The device according to claim 50, wherein the conductive primer layer comprises a dried water-based ink.

54. The device according to claim 50, wherein the conductive primer layer has a thickness of between approximately 1 micrometer to approximately 10 micrometers.

55. The device according to claim 1, wherein at least one of the bipolar current collector and the end plate current collector comprises a nickel current collector.

56. The device according to claim 1, wherein at least one of the bipolar current collector and the end plate current collector comprises a bimetallic Cu—Al current collector.

57. The device according to claim 1, wherein at least one of the bipolar current collector and the end plate current collector comprises a bimetallic Cu—Ni current collector.

58. The device according to claim 1, additionally comprising a frame, wherein the bipolar current collector and the end plate current collectors comprises at least one perimeter, and the frame is associated with the perimeter of at least one of the bipolar current collector and the end plate current collector.

59. The device according to claim 58, wherein the frame comprises at least one polymer layer.

60. The device according to claim 59, wherein the at least one polymer layer comprises at least one of a thermoplastic polymer and a thermoplastic ionomer.

61. The device according to claim 59, wherein the polymer layer is selected from one of the group consisting of polypropylenes, polyolefins, chlorinated or fluorinated polyolefins, acid-modified polypropylenes, acid-modified polyolefins, and polyesters.

62. The device according to claim 58, wherein the associated frame comprises a top and a bottom, wherein the top and the bottom are associated with each other so as to encompass the perimeter of the bipolar current collector therebetween.

63. The device according to claim 58, wherein the frame is secured to at least one of the bipolar current or end plate current collector by a heat weld.

64. The device according to claim 62 wherein the top of the frame and the bottom of the frame each comprise a perimeter, and the perimeters of both the top and bottom of the frame are joined together.

65. The device according to claim 58, having the frames of the at least two electrochemical energy storage cells substantially aligned, and wherein the frames of the at least two electrochemical energy storage cells comprise a thickness so as to create a cell space therebetween.

66. The device according to claim 65, wherein the frames of the at least two electrochemical storage cells comprise a perimeter, and the associated frames are welded along the perimeter to create a fluid-tight seal.

67. The device according to claim 66, wherein the fluid-tight seal results in the cell space having a pressure of less than atmospheric pressure.

68. The device according to claim 67, wherein the cell space comprises a pressure of at least 0.8 bar below atmospheric pressure.

69. The device according to claim 1, wherein the electrolyte comprises a non-aqueous electrolyte.

70. The device according to claim 69, wherein the electrolyte comprises a lithium-based salt selected from the group consisting of LiPF$_6$, LiBF$_4$, LiN(SO$_2$CF$_3$)$_2$, LiN(SO$_2$C$_2$F$_5$)$_2$, LiC(SO$_2$CF$_3$)$_3$, LiClO$_4$, LiAsF$_6$, lithium oxalato borates and other lithium borates.

71. The device according to claim 69, additionally comprising at least one electrolyte solvent, wherein the at least one solvent is associated with the electrolyte.

72. The device according to claim 71, wherein the solvent is selected from the group consisting of propylene carbonate, diethylcarbonate, ethylenecarbonate, dimethylcarbonate, ethyl-methylcarbonate, dimethylacetamide, diethylacetamide, gamma-butyrolactone, sulfolane, dimethylsulfite, diethylsulfite, trimethylphosphate, and valeronitrile.

73. The device according to claim 71, wherein the at least one electrolyte has a boiling point of 90° C. or greater.

74. The device according to claim 1, wherein the at least one monolithic battery unit comprises at least two monolithic battery units electrically connected in series.

75. The device according to claim 74, additionally comprising at least one bridge contact element associated between the at least two monolithic battery units.

76. The device according to claim 75, additionally including two terminal plates conductively associated with the terminal end plates, and two terminal contact elements between the terminal plates and the terminal end plates, wherein the bridge contact element and the terminal contact elements comprise the same material and thickness.

77. The device according to claim 1, wherein the at least one monolithic battery unit comprises at least two monolithic battery units electrically connected in parallel.

78. The device according to claim 77, additionally including two terminal plates conductively associated with terminal end plates of the at least two battery units, wherein the at least two battery units comprise an even number of battery units, and wherein the even number of battery units are electrically connected in parallel by the terminal plates such that the two terminal plates are at the same voltage.

79. The device according to claim 78, additionally comprising a means for manipulating the two terminal plates together so as to place pressure upon the battery unit, wherein the manipulating means comprises a conductive material.

80. The device according to claim 1, wherein the at least one monolithic battery unit comprises at least two monolithic battery units electrically connected in any combination of series and parallel connections.

* * * * *